(12) United States Patent
Lyding et al.

(10) Patent No.: US 8,070,920 B2
(45) Date of Patent: Dec. 6, 2011

(54) NANOMETER-SCALE SHARPENING OF CONDUCTOR TIPS

(75) Inventors: Joseph W. Lyding, Champaign, IL (US); Scott W. Schmucker, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 1183 days.

(21) Appl. No.: 11/740,678

(22) Filed: Apr. 26, 2007

(65) Prior Publication Data

US 2008/0105539 A1    May 8, 2008

Related U.S. Application Data

(60) Provisional application No. 60/794,924, filed on Apr. 26, 2006.

(51) Int. Cl.
*C23C 14/34* (2006.01)
(52) U.S. Cl. .............................. 204/192.34; 204/192.32
(58) Field of Classification Search ............. 204/192.32, 204/192.34
See application file for complete search history.

(56) References Cited

U.S. PATENT DOCUMENTS

| | | | |
|---|---|---|---|
| 5,727,978 A | 3/1998 | Alvis et al. | |
| 5,864,199 A | 1/1999 | Alvis et al. | |
| 5,993,281 A | 11/1999 | Musket | |
| 6,329,214 B1 | 12/2001 | Hattori et al. | |
| 6,452,171 B1 | 9/2002 | Moloni | |
| 6,504,151 B1 | 1/2003 | Mitchell et al. | |
| 6,902,716 B2 | 6/2005 | Lee et al. | |
| 2005/0006226 A1 | 1/2005 | Baldwin et al. | |
| 2007/0025907 A1* | 2/2007 | Rezeq et al. | 423/447.3 |
| 2009/0297422 A1 | 12/2009 | Zuo et al. | |

FOREIGN PATENT DOCUMENTS

| | | |
|---|---|---|
| JP | 04104448 | 4/1992 |
| JP | 08285867 | 11/1996 |
| JP | 2000081381 | 3/2000 |
| WO | WO 2006/035403 | 4/2006 |

OTHER PUBLICATIONS

Benatar et al. (Jun. 1998) "SPMs Step from Laboratory to Industry," The *Industrial Physicist* :34-36.
Biegelson et al. (Mar. 16, 1987) "Ion Milled Tips for Scanning Tunneling Microscopy," *Appl. Phys Lett.* 50(11):696-698.
de Raad (1999) "Use of the Schiller Decapitation Process for the Manufacture of High Quality Tungsten Scanning Tunneling Microscopy Tips," *J. Vac. Sci. Technol. B* 17(5):1946-1953.

(Continued)

*Primary Examiner* — Rodney McDonald
(74) *Attorney, Agent, or Firm* — Greenlee Sullivan P.C.

(57) ABSTRACT

The invention provides methods for sharpening the tip of an electrical conductor. The methods of the invention are capable of producing tips with an apex radius of curvature less than 2 nm. The methods of the invention are based on simultaneous direction of ionized atoms towards the apex of a previously sharpened conducting tip and application of an electric potential difference to the tip. The sign of the charge on the ions is the same as the sign of the electric potential. The methods of the invention can be used to sharpen metal wires, metal wires tipped with conductive coatings, multi-walled carbon nanotubes, semiconducting nanowires, and semiconductors in other forms.

24 Claims, 6 Drawing Sheets

OTHER PUBLICATIONS

Ding et al. (Jul. 1997) "Field Emission from Amorphous Diamond Coated Mo Tip Emitters by Pulsed Laser Deposition," *J. Vac. Sci. Tech. B*. 15(4):840-844.

Fink, H.W. (Sep. 1986) "Mono-Atomic Tips for Scanning Tunneling Microscopy," *IBM. J. Res. Dev.* 30(5):460-465.

Givargizov et al. (1998) "Ultrasharp Diamond-Coated Silicon Tips for Scanning-Probe Devices," *Microelectronic Engineering* 41-42: 499-502.

Hoffrogge et al. (Nov. 15, 2001) "Nanostructuring of Tips for Scanning Probe Microscopy by Ion Sputtering: Control of the Apex Ratio and the Tip Radius," *J. Appl. Phys.* 90(10):5322.

International Search Report and Written Opinion, Corresponding to International Application No. PCT/US07/67531, Mailed Jun. 26, 2008.

Keller et al., (1992) "Sharp, Vertical-Walled Tips for SFM Imaging of Steep or Soft Samples," *Ultramicroscopy* 42-44( 2):1481-1489.

Krauss et al. (Mar. 1, 2001) "Electron Field Emission for Ultrananocrystalline Diamond Films," *J. Appl. Phys.* 89(5):2958-2967.

Kubby et al. (Jan. 1986) "High Resolution Structuring of Emitter Tips for the Gaseous Ionization Source," *J. Vac. Sci Technol. B* 4(1):120-125.

Kubby, J.A. (1986) "Ion Beam Micro-Sculpturing," *Dissertation Abstracts International* 47-02(Sec. B):0660.

Lucier, A.S. (Feb. 2004) "Preparation and Characterization of Tungsten Tips Suitable for Molecular Electronics Studies," Masters of Science Thesis, McGill University, Montréal, Quebec, Canada, title page and pp. 5-32.

Miyamoto et al. (1991) "Ion Beam Fabrication of Diamond Probes for a Scanning Tunneling Microscope," *Nanotechnology* 2:52-56.

Moroshita et al. (Jan. 1991) "Sharpening of Monocrystalline Molybdenum Tips by Means of Inert-Gas Ion Sputtering," *J. Vac. Sci. Technol. A* 9(1):167-169.

Nützenadel et al. (Oct. 28, 1996) "Electron Field Emission from Diamond Tips Prepared by Ion Sputtering," *Appl. Phys. Lett.* 69(18):2662-2664.

Randall et al. (Nov./Dec. 2009) "Atomic Precision Lithography on Si," *J. Vac. Sci. Technol. B*. 27(6):2764-2768.

Schiller et al. (Oct. 1, 1995) "Decapitation of Tungsten Field Emitter Tips During Sputter Sharpening," *Surface Sci.* 339(3):L925-L930.

Sigmund (Nov. 1973) "A Mechanism of Surface Micro-Roughening by Ion Bombardment," *J. Mat. Sci.* 8(11):1545-1553.

Stepanova et al. (Mar./Apr. 1998) "Preparation of Ultrasharp Diamond Tip Emitters by Ion-Beam Etching," *J. Vac. Sci. Technol. B*. 16(2):678-680.

Vasile et al. (Sep. 1991) "Scanning Probe Tips Formed by Focused Ion Beams," *Rev. Sci Instrum*. 62(9):2167-2171.

Vasile et al. (1991) "Scanning Probe Tip Geometry Optimized for Metrology by Focused Ion Beam Ion Milling," *J. Vac. Sci. Instrum*. 9(6):3569-3572.

Ximen (2002) "Microfabrication of AFM tips using focused ion and electron beam techniques," *Ultramicroscopy* 42-44( 2):1526-1532.

Zhang (1996) "Preparation of Sharp Polycrystalline Tungsten Tips for Scanning Tunneling Microscopy Imaging," *J. Vacuum Sci. & Tech. B* 14(1):1-10.

Barber et al. (1973) "Prediction of Ion-Bombarded Surface Topographies Using Frank's Kinematic Theory of Crystal Dissolution," *J. Mater. Sci.* 8:1030-1040.

Bradley et al. (Jul./Aug. 1988) "Theory of Ripple Topography Induced by Ion Bombardment," *J. Vac. Sci. Technol. A* 6(4):2390-2396.

Carter et al. (1981) "A Second-Order Erosion Slowness Theory of the Development of Surface Topography by Ion-Induced Sputtering," *J. Mater. Sci.* 16:2091-2102.

Carter et al. (1977) "Analytical Modeling of Sputter Induced Surface Morphology," *Radiation Effects* 31:65-87.

Carter, G. (1976) "The Influence of Surface Diffusion on Topography Development of an Amorphous Solid During Sputtering," *J. Mater. Sci*.11:1091-1098.

Carter et al. (1973) "The Growth of Topography During Sputtering of Amorphous Solids," *J. Mater. Sci.* 8:1473-1481.

Güntherschulze et al. (1926) "Neue Untersuchengen Ober die Kathodenzerstäubung der Glimmerntladung," *Theodor Baum, ZS. F. Phys* 40:686-695.

Rezeq et al. (2006) "Tungsten Nanotip Fabrication by Spatially Controlled Field-Assisted Reaction with Nitrogen," *J. Chem. Phys.* 124:204716.

Sigmund, P. (Aug. 10, 1969) "Theory of Sputtering. I. Sputtering Yield of Amorphous and Polycrystalline Targets," *Phys. Rev.* 184(2):383-416.

Wang et al. (2006) "Diamond Cone Arrays with Controlled Morphologies Formed by Self-Organized Selective Ions Sputtering," *J. Appl. Phys.* 100:034312.

S.W. Schmucker, L.B. Ruppalt, J.W. Lyding, "One nanometer radius of curvature metallic probes created by field-directed sputter sharpening," International Conference on Nanoscience and Technology, poster presentation, Jul. 2006.

S.W. Schmucker, N. Kumar, J.R. Abelson, S.R. Daly, G.S. Girolami, J.W. Lyding, "High-Precision Atomic Patterning Enabled by Field-Directed Sputter Sharpening" Center for Nanoscale Science and Technology Nanotechnology Workshop, poster presentation, Sep. 2008.

\* cited by examiner

NANOMETER-SCALE SHARPENING OF CONDUCTOR TIPS

CROSS-REFERENCE TO RELATED APPLICATIONS

This application claims the benefit of U.S. Provisional Application 60/794,924, filed Apr. 26, 2006, which is hereby incorporated by reference to the extent not inconsistent with the disclosure herein.

ACKNOWLEDGEMENT OF GOVERNMENT SUPPORT

This invention was made at least in part with support from the Office of Naval Research under grant numbers N00014-03-1-0266 and N00014-06-10120. The United States Government has certain rights in this invention.

BACKGROUND OF THE INVENTION

Electrical conductors with ultrasharp tips have applications as probes for scanned probe microscopy and field emitters for use in scanning electron microscopy (SEM), transmission electron microscopy (TEM) and field emission displays. In probe microscopy, the sharpness of the tip affects the lateral resolution. For field emission, the sharpness of the tip affects the electric field at the tip.

A variety of techniques have been reported for producing sharp tips on electrical conductors, including electrochemical etching, chemical vapor deposition or electron beam deposition onto previously sharpened tips, and ion sputtering. Electrochemical etching is a common technique used to produce sharpened tips on wires of tungsten and other materials. Typically, the radius of curvature of the apex of the tip is about 1 micron or less. Electrochemically sharpened tungsten tips typically have an oxide layer present on the tip surface.

Several ion sputtering techniques have been described in the scientific and patent literature. Biegelson et al. (1987, Appl. Phys. Lett, 50(11) 696) report a technique in which a beam of energetic ions is directed towards an electrochemically etched tungsten tip at an angle with respect to the tip axis. The tip is then rotated within the ion beam, resulting in sputter removal of the oxide layer and reduction of the radius of curvature at the tip apex. U.S. Pat. No. 6,329,214 to Hattori et al, report ion milling of noble metal field emitters with an ion beam incidence angle of 30-60 degrees relative to the substrate normal direction.

Axial incidence ion beam sputtering techniques have also been reported. U.S. Pat. No. 5,993,281 to Musket describe sputtering by high-energy (30 keV and higher) ions incident along or near the longitudinal axis of a field emitter to sharpen the tip with a taper from the point, or top end, down the shank of the emitter. The process is reported to sharpen tips down to radii of less than 12 nm with an included angle of about 20 degrees. U.S. Pat. No. 6,329,214 to Hattori et al. reportion milling of emitters made of conductive material other than a noble metal with an ion beam incidence angle of zero degrees relative to the substrate normal direction. Kubby and Siegel (1986, J. Vac. Sci. Technol. B 4(1), 120) reportion milling of electropolished tungsten and iridium wire targets; the target was electrically isolated from the target chamber and mechanically rotated and the beam energy was in the interval 3-15 keV. Morishita and Okuyama (1991, J. Vac. Sci. Technol. A 9(1), 167) report sharpening of monocrystalline molybdenum tips with $Ar^+$ or $Xe^+$ ions focused into a beam approximately 350 microns across. Hoffrege et al. (2001, J. Appl. Phys., 90(10) 5322) describe variation of the angle between the ion beam and the macroscopic tip.

Focused ion beam (FIB) milling techniques have also been reported. Typical beam diameters (full width at half maximum) are from about 5 nm to about 1 μm. Vasile et al. describe FIB milling of electrochemically etched W and Pt—Ir tips via a three stage process (Vasile et al., 1991, Rev. Sci. Instrum., 62(9), 2167; Vasile et al., 1991, J. Vac. Sci. Technol. B 9(6)). Formation of microtips having radii of curvature between 4 nm and 30 nm was reported (Vasile et al., 1991, Rev. Sci. Instrum., 62(9), 2167). U.S. Pat. No. 5,727,978 to Alvis et al. describes FIB milling of platinum deposited on an electron beam emitting filament.

Self-sputtering sharpening techniques are also described in the scientific literature. As reported by Schiller et al. (1995, Surface Sci. 339 L925-930), electrochemically etched tips are placed in within an ambient neon environment and a high negative voltage is applied to the tip. Under such a voltage, electrons are emitted directly from the tip, impacting and ionizing surrounding neon ions. These positively charged neon ions are attracted to and sputter the tip. The sputtering process results in "necking" and then "decapitation" of the tip.

There remains a need in the art for methods for producing nanometer-scale conducting tips, especially methods which are self-limiting and capable of sharpening more than one tip at a time.

SUMMARY OF THE INVENTION

One aspect of the invention provides methods for sharpening the tip of an electrical conductor. Since the sharpened tips can be used as probes or field emitters, some embodiments of the invention also provide methods for sharpening the tips of probes or field emitters. The methods of the invention are capable of nanometer-scale sharpening, producing ultrasharp tips having an apex radius of curvature less than 10 nm. Typically, the tips produced by the methods of the invention have an apex radius of curvature less than 5 nm. The sharpening methods of the invention can be self limiting, so that the tip shape eventually approaches an equilibrium value. The self limiting nature of the process can obviate the need for careful monitoring of the process and the need for expensive monitoring apparatus.

The sharpening methods of the invention are based on simultaneous direction of ionized atoms towards the apex of a previously sharpened conducting tip and application of an electric potential difference to the tip relative to some reference potential (such as the potential of the surrounding vacuum chamber, which may be electrically grounded). The sign of the charge on the ions is the same as the sign of the electric potential difference. Application of an electric potential to the tip generates an electric field around the tip, with the strength of the field varying inversely with the tip radius of curvature. Because the electric field surrounding the tip is non-uniform and dependent on the tip form, the flow of ions is modified by the shape of the tip apex. This results in a selective repulsion of ions from the tip apex and a modification of the angle at which ions impact the tip. As sharpening proceeds, the apex radius of curvature is further reduced, which further increases the local electric field strength and enhances the sharpening effect. This process may be termed "field-directed sputter sharpening."

For a given conductor material, type of ion and ion angle of incidence, the accelerating voltage of the ions and the voltage applied to the conducting tip are selected together to provide the desired tip sharpness. The difference between the ion accelerating voltage and the tip voltage is sufficiently large that sputtering of the tip occurs, but not so large that the influence of the tip voltage is negligible. Simulations of the sputtering process can be used to aid in selection of the accelerating voltage and the voltage applied to the sharpened conductor.

In an embodiment, the invention provides a method for sharpening the tip of an electrical conductor comprising the steps of:
  a. providing a vacuum in a vacuum chamber;
  b. providing a conductor comprising a tip having an initial radius of curvature less than 1 micron at its apex, the conductor being located within the vacuum chamber; and
  c. simultaneously applying a voltage to the conductor and directing a flux of ions onto the tip of the conductor, the ions being characterized by an acceleration voltage, wherein the sign of the voltage applied to the conductor is the same as the sign of the charge of the ions, wherein the acceleration voltage and the voltage applied to the conductor are selected so that the tip of the conductor is sputtered by the ions, thereby reducing the radius of curvature at the apex of the tip.

In one aspect of the invention, the final radius of curvature at the apex of the tip is less than about 5 nm. In an embodiment, the ion acceleration voltage is between about 550 eV and 5 keV and the voltage applied to the conductor is 100 V or more. In an embodiment, at least some of the ions have an angle of incidence with respect to the longitudinal axis of the conductor of less than or equal to 35 degrees.

In the methods of the invention, an ion source (for example, a plasma) may be used to generate ions. A flux (or flow) of ions may be obtained when the ions from the ion source are accelerated by means of an electric potential difference, referred to herein as the acceleration voltage. The electric field associated with this electric potential difference affects the trajectory of the ions. A variety of ions are known to those skilled in the art.

In an embodiment, the ion flux is provided by a collimated beam of ions. In one embodiment, the longitudinal axis of the ion beam is substantially aligned with (within 5 degrees of) the longitudinal axis of the conductor. In this embodiment, the conductor need not be rotated. In another embodiment, the longitudinal axis of the ion beam may be at a non-zero angle to the longitudinal axis of the conductor. In an embodiment, the angle between the ion beam and longitudinal axis of the conductor is less than or equal to 35 degrees. In this embodiment, the conductor may be rotated to sharpen the conductor more uniformly. In another embodiment, a focusing ring can be used to cause ions to impinge upon the conductor at an angle off the longitudinal axis.

In another embodiment, the ion flux is not in the form of an ion beam and the ions have a greater variation in the angle of incidence with respect to the conductor. In an embodiment, the electric field lines associated with the accelerating voltage are substantially aligned with the longitudinal axis of the conductor. In another embodiment, the angle between the electric field lines and longitudinal axis of the conductor is less than or equal to 35 degrees. In another embodiment, at least some of the ions have an angle of incidence with respect to the longitudinal axis of the conductor of less than or equal to 35 degrees. Batch processing in chambers that produce large area ion fluxes may tune the distribution of ion incidence from on axis to random.

In an embodiment, the spot size of the ion beam or the area of the ion flux is sufficiently large to sputter a plurality of conductors simultaneously. The ability to sputter multiple tips in parallel would potentially allow for dozens or hundreds of tips to be simultaneously prepared, significantly increasing production throughput.

The invention also provides ultrasharp probe and field emitter tips. In an embodiment, probe or field emitter tips have an apex radius of curvature less than 2 nm. In an embodiment, the tip is not a single crystal metal tip. In another embodiment, the probe or field emitter tip is made of a material other than tungsten. The ultrasharp probes provided by the invention may be used in scanning probe microscopy.

The invention also provides apparatus which enable sharpening of conductor tips using the methods of the invention. The apparatus may be stand-alone. The apparatus may also be a scanning probe microscope apparatus which allows in situ sharpening of the probe tip or an electron microscope apparatus which allows in situ sharpening of the field emitter.

DETAILED DESCRIPTION OF THE INVENTION

Figure 1:
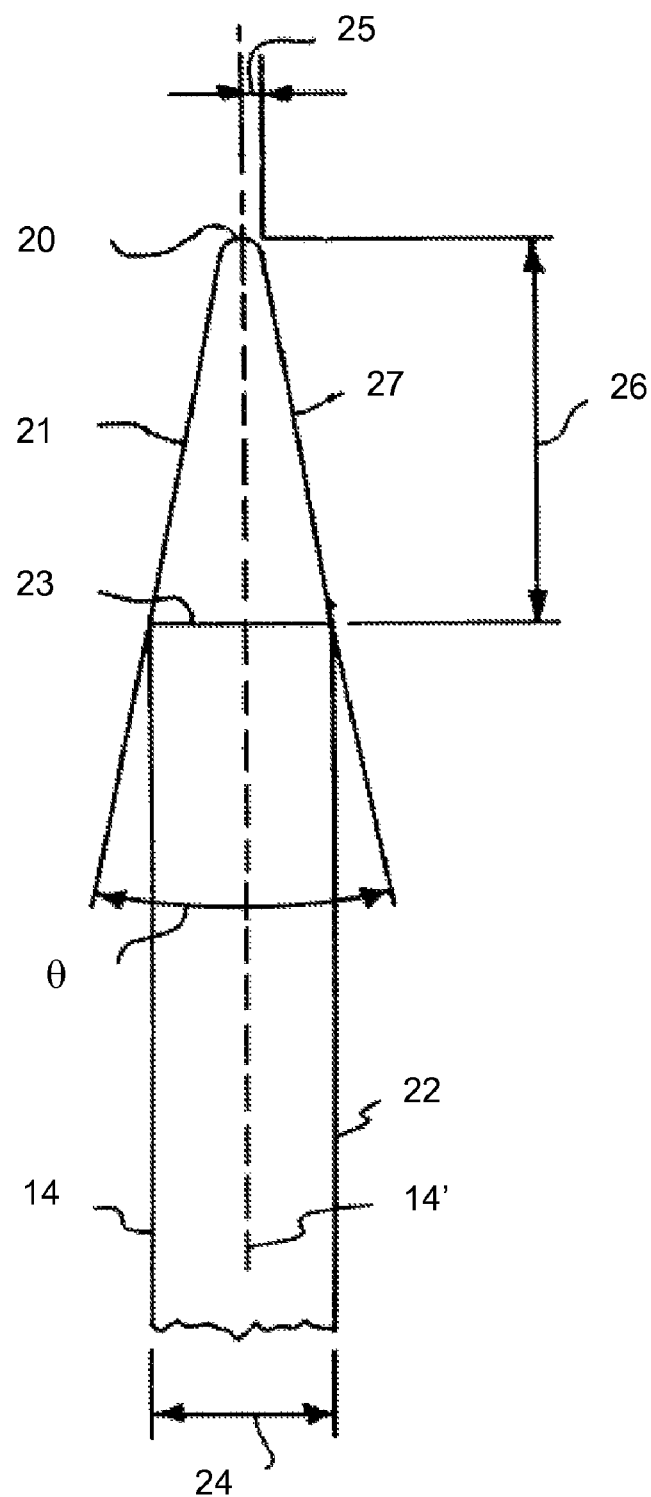
FIG. 1: Schematic illustrating structural features of a sharpened tip.

FIG. 1 is a schematic illustration of a conductor 14 having a longitudinal axis 14'. The conductor also has a tip; the term "tip" as used herein refers to a pointed or narrowed end. The tip 21 of the conductor tapers from its apex 20 to its base 23. The cross-sectional diameter or width 24 of the tip base 23 is the same as that of conductor shank 22 (which is unchanged from its initial value). The tip length 26 is the distance between the apex 20 and base 23. The tip apex has a radius of curvature 25 (distance between the arrows in FIG. 1). The tip may also be characterized by the included angle or cone angle defined by the tapered surface of the tip (indicated by θ in FIG. 1). When the tip geometry is more complicated than that shown in FIG. 1, the cone angle may vary along the tip length and/or multiple apices may be present. The cone angle may be determined near the tip apex or at a specified distance from the tip apex. At a specified distance from the tip apex, the cone angle may be estimated as twice the angle whose tangent is half the tip width at the specified distance divided by the specified distance. If multiple apices are present, the primary apex is that which is most centrally located. The measurement of a tip's radius of curvature can be achieved by fitting a circle within the apex within a TEM image and measuring the radius directly.

As used herein, sharpening a tip includes reducing the radius of curvature at the tip apex. In an embodiment of the invention, the initial radius of curvature of the tip apex is less than about 1 micron (this is the tip radius before field-directed sputter sharpening). Tips with this initial radius of curvature may be obtained by electrochemical etching or any other suitable method known to those skilled in the art. In different embodiments, the methods of the invention allow reduction of the radius of curvature at the primary tip apex to less than 5 nm, less than or equal to 2 nm, less than or equal to 1.5 nm, or less than or equal to 1 nm.

In an embodiment, sharpening of the tip also leads to reduction of the cone angle as determined near the tip apex. Without wishing to be bound by any particular belief, it is believed that smaller cone angles can be achieved if the ion flux or beam is not strictly aligned with the tip. The sharpening process of the present invention may also lead to a decrease in the overall length of the conductor, an increase in the tip length, and/or a reduction in the cone angle as determined at other locations along the tip length.

In the sharpening methods of the invention, the electric field around the conductor tip is used to direct ions in the vicinity of the tip and thereby control sputtering of material from the tip. In particular, the path of these ions is affected by the repulsive force generated between charge stored within the conductor and ions in the vicinity of the conductor; the magnitude of the force depends on the magnitude of the electric field. Typically, the electric field around the conductor will change during the sharpening process, with enhancement of the field near the tip apex as the tip sharpens.

For a given tip bias voltage, the shape of the sharpened tip approaches an equilibrium shape after extended sputtering. Therefore, the process can be self-limiting. The equilibrium form of the sputtered tip depends on several parameters. These include the relation between angle of incidence and sputter yield (a property of the selected tip material and ion), the angle of the incoming ions, and the bias applied to the tip as it relates to the ion energy.

The electric field around the conductor tip depends on the electric potential applied to the conductor relative to a reference potential (such as the potential of the vacuum chamber). This electric potential difference can also be termed the applied voltage or the applied bias voltage. One upper limit on the absolute value of the applied potential is the acceleration voltage minus the threshold value for sputtering to occur. In an embodiment, the upper limit on the absolute value of the applied potential is the accelerating voltage less approximately 500 V. In different embodiments, the absolute value of the applied voltage is greater than 25 V, greater than 50 V, greater than 100 V, greater than 200 V, greater than 300 V, greater than 400V, greater than 500V, greater than 750 V, or greater than 1000 V. In different embodiments where the ion accelerating voltage is between 1 keV and 5 keV or approximately 2000 eV, the absolute value of the applied potential is between 100 and 700V, between 200 and 600 V, or between 300 and 500V.

The applied voltage may be substantially constant or varying. In different embodiments, the variation in voltage is less than 5% or less than 1%. The voltage variation may take the form of a series of constant voltages applied to the conductor. For example, the first voltage applied may be higher (e.g. 600-800 V) and the second voltage applied may be lower (e.g. 100-400V). A multi-stage process may also use at least one stage with a constant voltage and at least one stage with a non-constant voltage. For example, application of a constant voltage may be followed by application of a varying voltage to the tip. The potential may be applied by any means known to those skilled in the art. For example, the potential may be applied using a voltage supply. Alternately, the potential difference may be generated automatically by using a resistor to electrically separate the conductor from the vacuum chamber. The ion flux would then charge the conductor up to some potential.

The difference between the accelerating voltage of the ions and the potential applied to the conducting tip is sufficiently high that sputtering occurs when the tip is contacted with the ion flux. A lower limit on the difference between the acceleration voltage and the tip bias is that this difference is greater than or equal to the threshold energy for sputtering. In an embodiment, this difference is great enough that the sputtering yield is greater than about 0.001. Relatively low sputtering yields can be compensated by relatively high ion current densities. In other embodiments, the sputtering yield is greater than 0.25, greater than 0.5 or is approximately 1. In different embodiments, the difference between the ion accelerating voltage and the potential applied to the conductor is greater than or equal to 100 eV, greater than or equal to 200 eV, greater than or equal to 300 eV, greater than or equal to 400 eV, greater than or equal to 500 eV, greater than or equal to 600 eV, or greater than or equal to 700 eV. As used herein, the tip is contacted with the ion flux when at least part of the tip is contacted with at least part of the ion flux.

The ion acceleration voltage (also termed the accelerating voltage) is sufficiently high that sputtering of the tip occurs. In different embodiments, the accelerating voltage of the ions is between 550 eV and 10 keV, or between 550 eV and 5 keV. Reasonable sputtering rates may also be obtained at lower accelerating voltages if the ion current density is sufficiently high (for example in a plasma reactor system). In an embodiment, use of accelerating voltages below those at which substantial implantation occurs can enhance the tip sharpness. In another embodiment, the energy of the ion flux is less than about 300 keV The ion beam may comprise positive or negative ions. Ion beam production techniques and devices are known to those skilled in the art. Sources of positive ion beams include, but are not limited to, ion guns. Suitable positive ions include, but are not limited to neon, argon, xenon, and helium ions. The ion current density is sufficiently high to allow the desired rate of sharpening. In an embodiment, greater ion current density can be attained by alignment of the conductor with the central portion of the ion beam. In an embodiment, the spot size of the beam is greater than about 1 micron. As used herein, the conductor tip is contacted with the ion beam when at least some of the ions in the beam contact the tip. In one embodiment where the ion flux is provided by an ion beam, the acceleration voltage of the beam is between 550 and 5 keV and the voltage applied to the conducting tip is greater than 100 V.

Ion fluxes which are not in the form of ion beams may be provided by plasma reactors or similar pieces of equipment. Plasma reactors can provide ion current densities on the order of milliamperes per square centimeter. A variety of plasma reactor configurations are known to those skilled in the art. For example, plasma reactors such as parallel plate (diode-type) reactors, triode reactors, and inductively coupled plasma (ICP) reactors are well known for use in plasma etching processes for semiconductor circuits. These conventional plasma reactors may be adapted to allow separate control of the bias on the conducting tip.

In an embodiment, the conductor is in the form of a wire, nanowire or column having a pointed or narrowed tip and a width or diameter less than its length. In another embodiment, the conductor may be in the form of a pyramid or other shape having a pointed tip. For example, methods for formation of silicon pyramids are known to those skilled in the art.

Electrically conducting materials suitable for use with the invention include, but are not limited to, metals, carbon, and semiconductors. In an embodiment, materials suitable for use with the invention have a resistivity less than $10^7$ Ωm. To avoid significant charging effects, the resistance between the apex and ground should be less than several Mohms (megaohms).

In an embodiment, the conductor is selected from group consisting of a metal, a conductive diamond or diamond-like carbon tipped metal, a transition metal carbide tipped metal, a transition metal nitride tipped metal, a multi-walled carbon nanotube, and a semiconductor The metal may be a transition metal, a noble metal or ferromagnetic metal. In an embodiment, the metal is a transition metal selected from the group consisting of tungsten, molybdenum, chromium, titanium, vanadium, zirconium, niobium, hafnium, and tantalum. In another embodiment, the metal is a noble metal selected from the group consisting of silver, gold, palladium, platinum, rhodium, iridium, ruthenium, osmium, and rhenium, and combinations thereof. Combinations of noble metals include alloys such as platinum-iridium alloys. The metal may also be a ferromagnetic metal selected from the group consisting of iron, cobalt, nickel and combinations thereof. The metal may be polycrystalline. Metal wires useful as conductors for the present invention may be of any suitable dimensions known to those skilled in the art for the intended application. In an embodiment, the diameter of the wire is less than 1 mm.

Conductive diamond or diamond-like carbon tipped metals suitable for use with the invention have carbon coatings sufficiently thick that the sharpening process does not completely remove the coating. It is sufficient that the carbon not be completely removed at the apex or along some distance from the apex. In an embodiment, the thickness of the carbon coating is between about 10 nanometers and about 10 microns. Diamond or diamond-like carbon coatings can be deposited by any method known to the art, including a variety of chemical vapor deposition (CVD) techniques. Microwave plasma CVD techniques have been used to deposit ultrananocrystalline diamond films 0.1-2.4 microns thick on sharp single Si microtip emitters (Krauss et al., 2001, J. Applied Physics, 89(5), 2958-2967). Amorphous diamond films have been deposited on Mo tip emitters by pulsed laser deposition (Ding, M. Q. et al, 1997, J. Vac. Sci. Tech. B, 15(4), 840-844).

Metals tipped with transition metal carbides or nitrides are also suitable for use with the invention. The transition metal is selected from the group consisting of titanium, zirconium, hafnium, vanadium, niobium, tantalum, chromium, molybdenum, and tungsten. The carbide or nitride coating is sufficiently thick that the sharpening process does not completely remove the coating. It is sufficient that the coating not be completely removed at the apex or along some distance from the apex. In an embodiment, the thickness of the coating is between about 10 nanometers and about 10 microns. Transition metal carbide and nitride coatings can be deposited by any method known to the art, including a variety of chemical vapor deposition (CVD) techniques. When the coating is formed on a transition metal, the coating may be produced via carburization or nitridation.

The conductor may also be a multi-walled carbon nanotube. As used herein, the term "nanotube" refers to a tube-shaped discrete fibril typically characterized by a substantially constant diameter of typically about 1 nm to about 100 nm, preferably about 2 nm to about 50 nm. In addition, the nanotube typically exhibits a length greater than about 10 times the diameter, preferably greater than about 100 times the diameter. The term "multi-wall" as used to describe nanotubes refers to nanotubes having a layered structure, so that the nanotube comprises an outer region of multiple continuous layers of ordered atoms and an optional distinct inner core region or lumen. The layers are disposed substantially concentrically about the longitudinal axis of the fibril.

The conductor may also be a semiconducting material. In an embodiment, the semiconducting material is selected from the group consisting of silicon, germanium, or a compound semiconductor comprised of elements from groups III and V of the periodic table. In an embodiment, the conductor is a semiconducting nanowire. As used herein, a nanowire has a diameter or width less than about one micron. In another embodiment, the conductor has a pyramidal shape formed by anisotropic etching.

The field-directed sputtering process of the present invention takes place under vacuum. As used herein, a vacuum refers to a pressure which is less than atmospheric pressure rather than to a perfect vacuum. Suitable background pressures, sans sputtering noble gas, are specified by ion gun manufacturers and are known by those skilled in the art. Under batch processing in a plasma system the pressures can be on the order of $1\times10^{-4}$ to $1\times10^{-2}$ torr during processing. In an ion gun system, the noble gas pressure during sputtering can reach $5\times10^{-5}$ torr. Typically, the source of vacuum will be one or more vacuum pumps. Pumps suitable for obtaining desired vacuum levels are known to those skilled in the art.

In an embodiment, the temperature of the conductor is controlled during the sputtering process. In an embodiment, additional heat is applied to the conductor during the sputtering process to allow at least some annealing of defects generated during sputtering. Suitable temperatures for annealing of ion bombardment induced defects are material dependent and known to those skilled in the art. In an embodiment, the conductor is heated to a temperature less than about 1000° C. The conducting tips produced by the methods of the invention may also be annealed after sharpening, but some blunting of the tip may result.

The methods of the invention are capable of producing conductors with ultrasharp tips. In different embodiments, the tips produced by the methods of the invention have an apex radius of curvature less than 10 nm, less than 5 nm, less than or equal to 2 nm, less than or equal to 1.5 nm, or less than or equal to 1 nm. Conductors produced by the methods of the invention are suitable for use as microscope probes (also known as microscope probe tips) and field emitters (also known as field emitter tips).

In an embodiment, the invention provides a method for sharpening the tip of an electrical conductor comprising the steps of:
  a. providing a vacuum in a vacuum chamber;
  b. providing a conductor comprising a tip having an initial radius of curvature less than 1 micron at its apex, the conductor being located within the vacuum chamber; and
  c. simultaneously applying a voltage to the conductor and contacting the tip of the conductor with an ion beam characterized by a beam accelerating voltage and comprising positive or negative ions, wherein the sign of the voltage applied to the conductor is the same as the sign of the charge of the ions, wherein the beam accelerating voltage and the voltage applied to the conductor are selected so that the tip of the conductor is sputtered by the ion beam, thereby reducing the radius of curvature at the apex of the tip to 5 nm or less.

In another embodiment, the invention provides a method for sharpening the tip of an electrical conductor comprising the steps of:
a. providing a vacuum in a vacuum chamber;
b. providing a conductor comprising a tip having an initial radius of curvature less than 1 micron at its apex, the conductor being located within the vacuum chamber; and
c. simultaneously applying a constant positive electric potential to the conductor relative to the vacuum chamber and contacting the tip of the conductor with an ion beam comprising positive ions, thereby reducing the radius of curvature at the apex of the tip.

The invention provides apparatus capable of sharpening a conductor having an initial tip radius of about one micron or less. In an embodiment, the apparatus comprises a vacuum chamber connected to a vacuum source, an ion flux source in communication with the vacuum chamber, a sample holder capable of supporting the conductor having a tip and capable of being electrically connected to the conductor and a source of electrical potential difference connected between the sample holder and the vacuum chamber. In one embodiment, the ion flux source comprises a plasma source in combination with a source of ion acceleration voltage. Plasma reactor systems can provide such an ion flux source and also include a vacuum chamber. In another embodiment, the ion flux source is an ion beam. The ion flux source is in communication with the vacuum chamber so that the ion flux can be introduced into the chamber. In one embodiment, the ion flux source may be located within the vacuum chamber. In an embodiment, the sample holder is adapted to hold the longitudinal axis of the conductor to be sharpened at a selected angle (for example a predetermined angle with respect to the longitudinal axis of an ion beam). The sample holder may be capable of x, y, z, and rotational adjustments. The apparatus may further comprise a current measuring device connected between the tip and the bias source.

The apparatus may also further comprise a focusing ring. The focusing ring functions as an electrostatic lens. In an embodiment, the focusing ring is a metal ring positioned between an ion beam source and the conductor to be sharpened so that the ion beam passes through the opening of the ring. The focusing ring is connected to a second source of electrical potential difference. During sharpening, a potential is applied to the ring, resulting in focusing of the beam. The beam is focused enough to obtain the desired angle of incidence of ions with respect to the conductor to be sharpened. The voltage applied to the ring is less than the ion beam voltage and depends on the size of the ring. In an embodiment, the voltage applied to the ring is several hundred volts. In an embodiment, the amount of focusing ranges from 0 to 35 degrees relative to the longitudinal axis of the tip.

The apparatus may also comprise a heater connected to the sample holder. Suitable heating devices for use in controlling the temperature of sample holders under vacuum are known to those skilled in the art and include, but are not limited to resistance-based heaters.

In an embodiment, the invention provides a stand-alone ion sputtering apparatus capable of sharpening a conductor having a sharp tip, the apparatus comprising:
a. a vacuum chamber connected to a vacuum source;
b. an ion flux source in communication with the vacuum chamber;
c. a sample holder adapted to hold the conductor to be sharpened; and
d. a source of electrical potential difference connected between the sample holder and the vacuum chamber.

The invention also provides a scanning probe microscope apparatus capable of in-situ sharpening of the probe tip. In an embodiment, the invention provides a scanning probe microscope apparatus comprising a vacuum chamber, a scanning probe microscope, an ion beam source and a source of potential difference connected so as to establish an electrical potential difference between the probe and the vacuum chamber. The scanning probe microscope has a probe comprising a tip and may be any form of probe microscope known to the art capable of operating with a conducting probe. Such scanning probe microscopes include, but are not limited to, scanning tunneling microscopes, atomic force microscopes, magnetic force microscopes, electrostatic force microscopes, scanning voltage microscopes, Kelvin force probe microscopes, and scanning gate microscopes. The apparatus is configured so that the ion source and the probe can be positioned to obtain the desired relationship between the longitudinal axes of the ion beam and the probe. In an embodiment, the ion source is disposed so that the longitudinal axis of the ion beam is capable of being substantially aligned with the longitudinal axis of the tip. In most cases the tip is removed from the microscope but not from the vacuum chamber to place it into alignment with the ion beam. If the probe remains within the microscope, the microscope may be moved laterally or rotated to align the probe with the ion beam. The source of electrical potential difference will typically be connected between the probe holder used to hold the probe at the time of sharpening and the vacuum chamber.

In an embodiment, the invention provides a scanning probe microscope apparatus capable of in-situ sharpening of the probe tip, the apparatus comprising:
a. a scanning probe microscope comprising a vacuum chamber and a probe comprising a tip, the tip apex having an initial radius of curvature less than 1 micron and the probe being located within the vacuum chamber;
b. an ion beam source in communication with the vacuum chamber; and
c. a source of electrical potential difference connected to establish a an electrical potential difference between the probe and the vacuum chamber, wherein the apparatus is adapted so that probe can be moved within the vacuum chamber to substantially align the longitudinal axis of the tip with the longitudinal axis of the ion beam for sharpening.

In another embodiment, the invention provides an electron microscope apparatus capable of in-situ sharpening of the field emitter tip. The apparatus comprises an electron microscope comprising a field emitter tip and a vacuum chamber connected to a vacuum source, an ion beam source and a source of electrical potential difference connected to establish an electrical potential difference between the tip and the surrounding vacuum chamber. The source of potential difference can be the same source of potential difference that causes field emission and therefore can be part of the microscope. The microscope has a field emitter tip and may be any form of electron microscope known to the art, including scanning electron microscopes and transmission electron microscopes. The apparatus is configured so that the ion source and the field emitter tip can be positioned to obtain the desired relationship between the longitudinal axes of the ion beam and the field emitter tip. In an embodiment, the ion source is disposed so that the longitudinal axis of the ion beam is capable of being substantially aligned with the longitudinal axis of the tip. In an embodiment, the tip may be rotated to the side in order to face the ion gun.

In an embodiment, the invention provides an electron microscope apparatus capable of in-situ sharpening of the field emitter tip, the apparatus comprising:

a. a electron microscope comprising a field emitter tip and a vacuum chamber connected to a vacuum source;

b. an ion beam source in communication with the vacuum chamber; and c. a source of electrical potential difference connected to establish an electrical potential difference between the tip and the surrounding vacuum chamber, wherein the apparatus is adapted to allow rotation of the tip so that the longitudinal axis of the tip is substantially aligned with the longitudinal axis of the ion beam for sharpening.

When a Markush group or other grouping is used herein, all individual members of the group and all combinations and subcombinations possible of the group are intended to be individually included in the disclosure. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general the terms and phrases used herein have their art-recognized meaning, which can be found by reference to standard texts, journal references and contexts known to those skilled in the art. The preceding definitions are provided to clarify their specific use in the context of the invention.

Example 1

Simulation of Beam-Tip Interaction for Perfectly Conductive Materials

The electric field surrounding a biased conductor with a sharp tip was simulated for a two-dimensional case assuming that the material was a perfect conductor, resulting in an absence of electric fields within the tip. The electric potential was also assumed to be constant and present across the entirety of the conductor. The simulations demonstrated that the electric field was dramatically enhanced near the apex of the tip. The sharper the tip, the more prominent the enhancement.

Figure 2A:
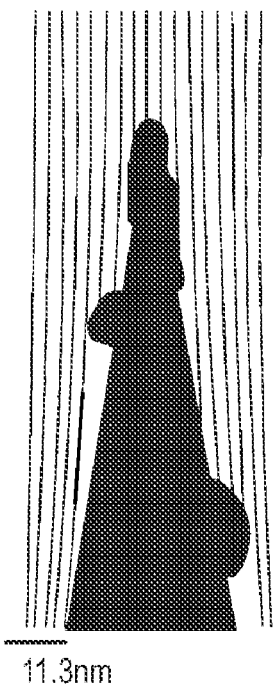
FIG. 2A: Ion path simulation results for a neon ion beam aligned with the longitudinal axis of the conductor. The neon atoms are singly ionized with an energy of 2000 eV, while the bias applied to the tip is 100V.
Figure 2B:
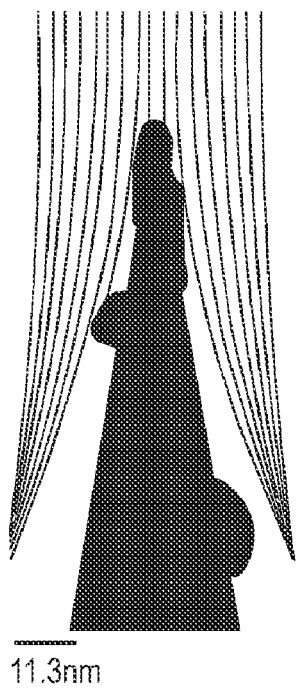
FIG. 2B: Ion path simulation results for a neon ion beam aligned with the longitudinal axis of the conductor. The neon atoms are singly ionized with an energy of 2000 eV, while the bias applied to the tip is 400V.
Figure 2C:
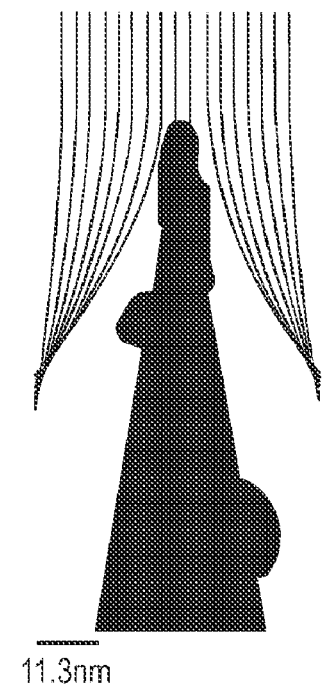
FIG. 2C: Ion path simulation results for a neon ion beam aligned with the longitudinal axis of the conductor. The neon atoms are singly ionized with an energy of 2000 eV, while the bias applied to the tip is 100V.

The ion motion surrounding the biased conductor tip was also simulated. FIGS. 2A, 2B, and 2C present ion path simulation results for a neon ion beam aligned with the longitudinal axis of the conductor. The ion beam accelerating voltage was 2000 eV; the neon atoms were singly ionized. FIGS. 2A, 2B, and 2C show simulation results for tip potentials of 100 V, 400V, and 800 V respectively. As anticipated, the charged particles are repelled and higher tip bias results in stronger repulsion.

Figure 3:
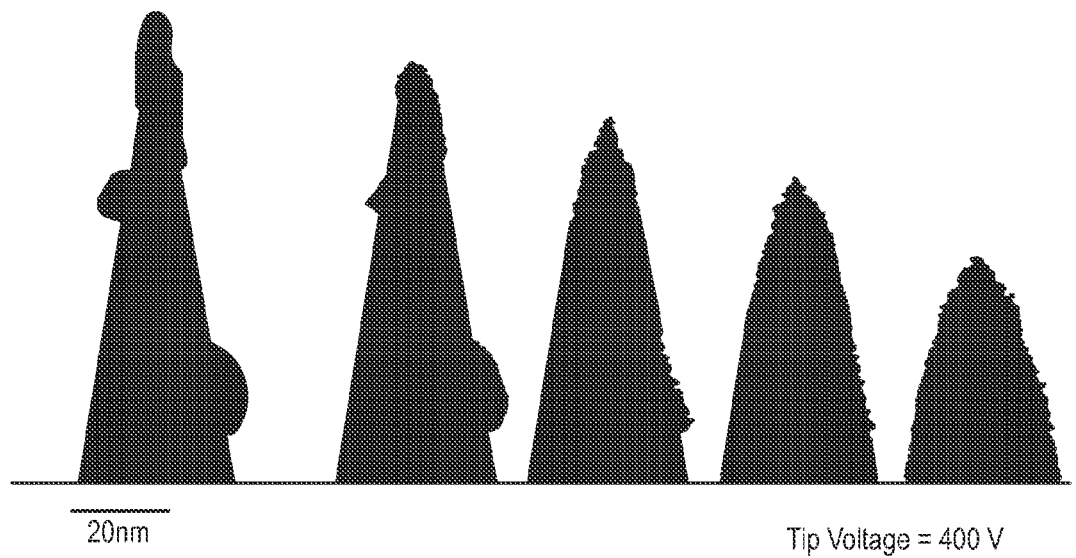
FIG. 3: Simulated field-directed sputtering under 400V tip voltage, 2000 eV argon ion energy, and beam aligned with the longitudinal axis of the conductor.
Figure 4:
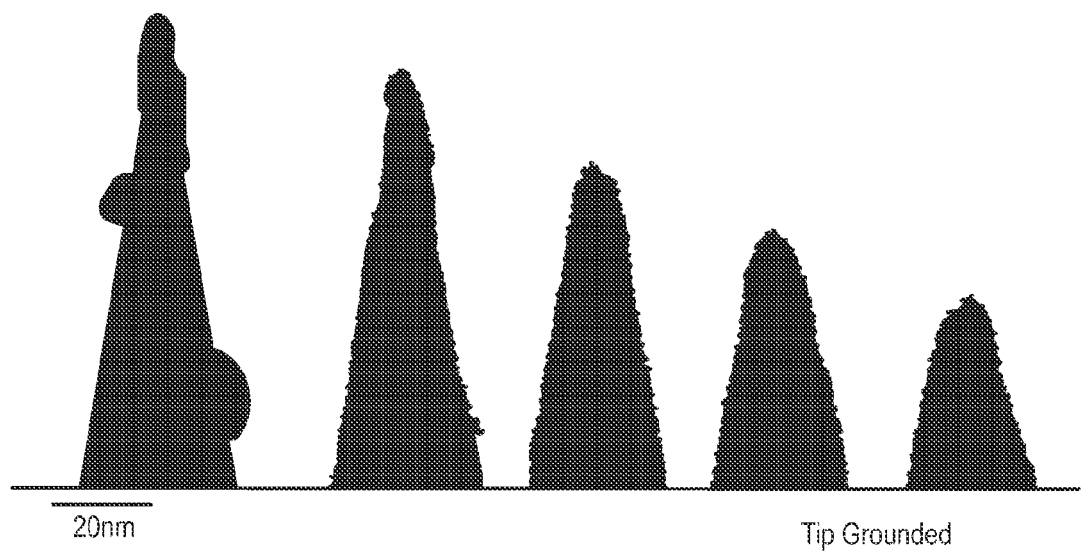
FIG. 4: Simulated field-directed sputtering for zero tip voltage, 1600 eV argon ion energy, and beam aligned with the longitudinal axis of the conductor.

Sputtering of the conductor tip by the incoming ions was modeled by dividing the simulated tip into finite elements (represented by pixels within the image in FIGS. 3-4). The scale of the image is selected based on physical parameters such that each pixel corresponds to one atom within the tip. An extensive series of incoming ions were generated sequentially with a uniform random distribution in the lateral direction. The ion paths were simulated until the ion impacted the body of the tip or departed from the tip vicinity. Upon impact, the removal of atoms by sputtering was simulated by an algorithm based on the Sigmund model (Sigmund, 1973, J. Mat. Sci., 8, 1545). The distribution of energy within the tip and the penetration depth of ions was independently computed using the SRIM 2006 software package (Ziegler, et al, 1985, *The Stopping and Range of Ions in Solids*, Pergamon Press; http://www.srim.org/) and our simulator modeled sputtering from the fundamental theory and these data points. In addition, the tip was regularly reconstituted and any portions which had become disconnected from the primary body of the tip were fully removed from the system. Also minimization of surface energy was modeled by allowing the motion of atoms within two atomic diameters following each sputtering event if an energetically favorable position can be located. These simulations consider a two-dimensional tip and ignore interaction between ions. The simulations were saved in the form of animations. FIG. 3 shows still images extracted from an animation for a 2000 eV argon ion (singly ionized) beam and a tip voltage of 400V. In this figure, the images are equally spaced in time. FIG. 4 shows still images extracted from an animation of a 1600 eV argon ion beam where no tip voltage is applied (control experiment where the tip was electrically grounded). The time spacing is equal between figures. According to these simulations, approximately 20 minutes under an ion current density of 150 $\mu A/cm^2$ should be sufficient for complete sharpening of a tip with an initial radius of curvature of roughly 100 nm.

Example 2

Sharpening of Pt—Ir Tips

The experimental setup consisted of a vacuum chamber with a background pressure of approximately $5 \times 10^{-9}$ torr, which is attached to an ultra-high vacuum system containing a scanning tunneling microscope. Within the vacuum chamber was a Model 04-161 ion gun from Physical Electronics (advertised current density 300 $\mu A/cm^2$) controlled by a Model IPS Ion Sputtering Gun Power Supply from OCI Vacuum Microengineering, and a micromanipulator with x, y, z and rotational adjustments. Tip bias was provided by a Model M107 DC Voltage Source from Systron-Donner. Transmission electron microscope (TEM) imaging of the tips ex-situ was performed with a Philips CM200 microscope.

Platinum-iridium scanning tunneling microscopy probes were purchased commercially from Material Analytical Services (MAS). The initial apex radius of curvature of the Pt—Ir tips was roughly 100 nm.

Figure 5A:
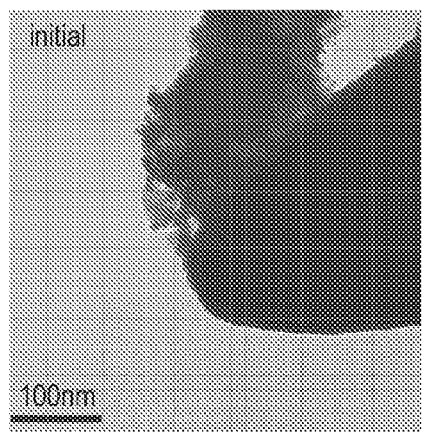
FIGS. 5A-5F: TEM images of a Pt—Ir tip prior to sputtering (FIG. 5A) and at various stages of the sputtering process (FIGS. 5B-5F).
Figure 5B:
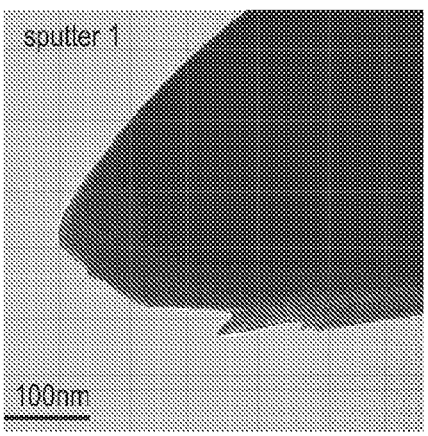
Figure 5C:
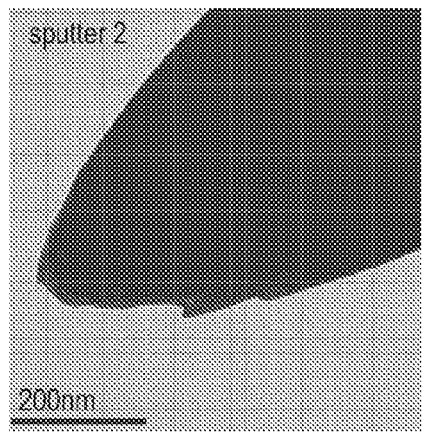
Figure 5D:
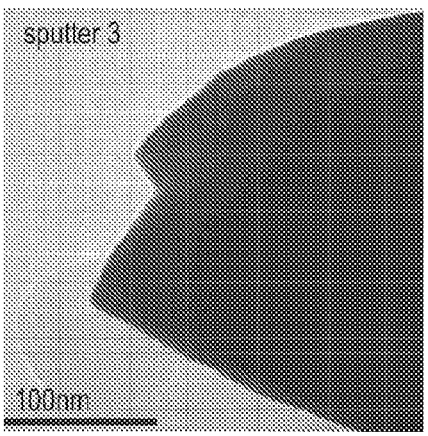
Figure 5E:
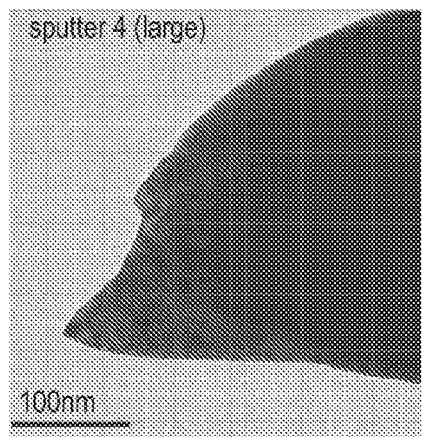
Figure 5F:
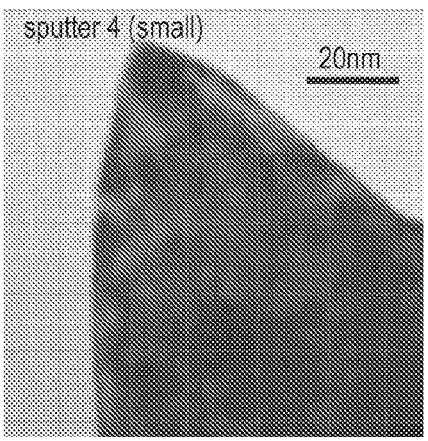

FIGS. 5A through 5F show TEM images of a Pt—Ir tip prior to sputtering (FIG. 5A) and at various stages of the sputtering process (FIGS. 5B through 5F). The tip voltage was 400 V and the neon ion energy was 2000 eV. The ion beam was directed substantially parallel to the longitudinal axis of the tip. FIG. 5A shows the initial status of the tip. A large mass of contaminant is present near the apex, and the tip has a radius of curvature of roughly 100 nm. After some sputtering (approximately 45 min.), as shown in FIG. 5B, the tip appears to have sharpened slightly and a secondary apex has appeared. Upon further sputtering (approximately 60 min), the side apex appears to have reduced, though the primary apex still has a radius of curvature of approximately 50 nm, as shown in FIG. 5C. It is believed that the tip was not centrally located within the beam during these first two sputtering stages. FIG. 5D shows that additional sputtering (30 min.) has further sharpened the tip apex and that another secondary apex has appeared. The contaminant seen in this image likely appeared ex-situ while transferring the tip from the sputtering system to the TEM. FIG. 5E shows the tip after further sputtering (30 min); the tip has become significantly sharper and the side apex has been reduced significantly. FIG. 5F is a higher magnification image of the tip in FIG. 5E, more clearly illustrating a radius of curvature bordering on the sub-nanometer range. The scale markers in these figures are as follows: FIGS. 5A-5B: 100 nm; FIG. 5C: 200 nm; FIGS. 5D-5E: 100 nm; FIG. 5F: 20 nm.

The cone angle for the primary apex in FIG. 5B was between 60 and 65 degrees. Measurement was made trigonometrically by roughly circumscribing a right triangle within the tip, measuring opposite and adjacent edges, and computing the arctangent For control experiments conducted with no tip bias and ion beam energies between 1600 and 2000 eV, the resulting tip radii were between 3 and 10 nm, typically between 5 and 10 nm.

Example 3

Sharpening of Tungsten Tips

The sputtering apparatus was as described in Example 2.

Tungsten wires with electrochemically etched tips were prepared by etching polycrystalline tungsten wire in sodium hydroxide solution. The initial apex radius of curvature of the tungsten tips was roughly 100 nm.

Figure 6A:
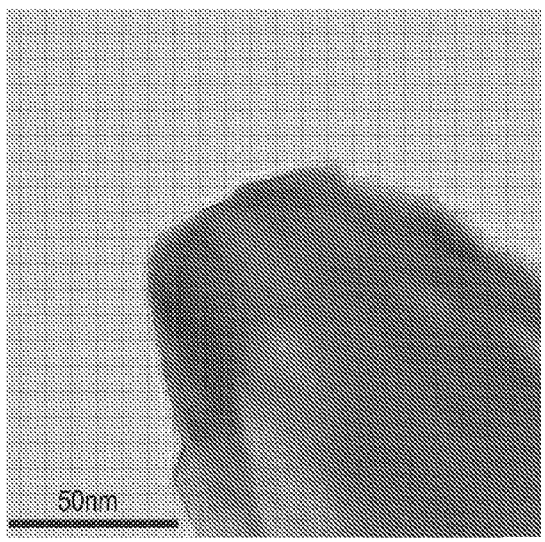
FIGS. 6A-6B: TEM image of a W tip prior to sputtering (FIG. 6A) and following sputtering (FIG. 6B).
Figure 6B:
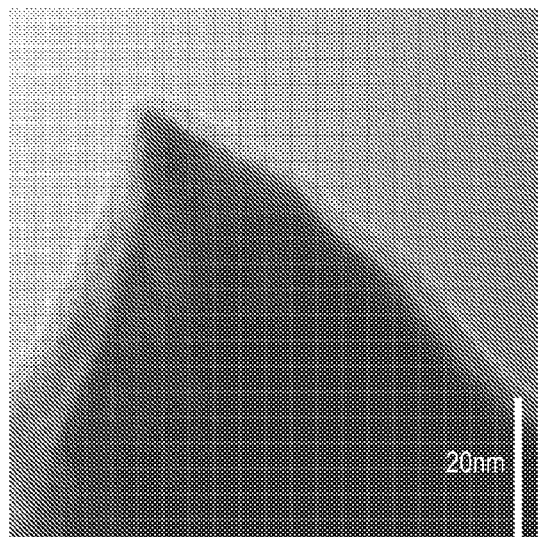

FIG. 6A shows a TEM image of a W tip prior to sputtering; a large flat face is present at the tip apex. FIG. 6B shows a TEM image of a W tip after sputtering; the tip radius is approximately 1.5 nm, time approx 15 min. The tip voltage was 400 V and the neon ion energy was 2000 eV. The ion beam was directed substantially parallel to the longitudinal axis of the tip. The scale marker in FIG. 6A is 50 nm; that in FIG. 6B is 20 nm.

For a control experiment with zero tip bias and 2000 eV beam accelerating voltage the resulting tip radius was approximately 6 nm.

We claim:

1. A method for sharpening the tip of an electrical conductor comprising the steps of:
 a. providing a vacuum in a vacuum chamber;
 b. providing a conductor comprising a tip having an initial radius of curvature less than 1 micron at its apex, the conductor being located within the vacuum chamber; and
 c. simultaneously applying a voltage to the conductor and directing a flux of ions onto the tip of the conductor, the ion flux being characterized by an acceleration voltage, wherein the sign of the voltage applied to the conductor is the same as the sign of the charge of the ions, wherein the acceleration voltage and the voltage applied to the conductor are selected so that the tip of the conductor is sputtered by at least some of the ions, thereby reducing the radius of curvature at the apex of the tip to less than 5 nm.

2. The method of claim 1, wherein a positive voltage is applied to the conductor and the ion flux comprises positive ions.

3. The method of claim 2, wherein the ion flux comprises ions selected from the group consisting of neon, argon, xenon, and helium ions.

4. The method of claim 1, wherein a negative voltage is applied to the conductor and the ion flux comprises negative ions.

5. The method of claim 1, wherein the absolute value of the difference between the acceleration voltage and the potential applied to the conductor is greater than 500 V.

6. The method of claim 5, wherein the absolute value of the potential applied to the conductor is greater than about 50 V.

7. The method of claim 6, wherein the absolute value of the potential applied to the conductor is greater than about 100 V.

8. The method of claim 1 wherein the ion flux is provided by an ion beam.

9. The method of claim 8, wherein the longitudinal axis of the beam is substantially aligned with the longitudinal axis of the conductor.

10. The method of claim 8, wherein the longitudinal axis of the ion beam is at a non-zero angle to the longitudinal axis of the conductor.

11. The method of claim 1, wherein the ion flux is provided by a plasma reactor.

12. The method of claim 1, wherein the conductor comprises a metal.

13. The method of claim 12, wherein the metal is a transition metal selected from the group consisting of tungsten, molybdenum, chromium, titanium, vanadium, zirconium, niobium, hafnium and tantalum.

14. The method of claim 12, wherein the metal is a noble metal selected from the group consisting of iridium, platinum, gold, silver, palladium, osmium, rhodium, ruthenium, rhenium, and combinations thereof.

15. The method of claim 12, wherein the metal is a ferromagnetic metal selected from the group consisting of iron, cobalt, nickel and combinations thereof.

16. The method of claim 12 wherein the tip of the conductor further comprises a conductive diamond or diamond-like carbon coating.

17. The method of claim 12, wherein the tip of the conductor further comprises a coating of a transition metal carbide or nitride, wherein the transition metal is selected from the group consisting of titanium, zirconium, hafnium, vanadium, niobium, tantalum, chromium, molybdenum, and tungsten.

18. The method of claim 1, wherein the conductor is a multi-walled carbon nanotube.

19. The method of claim 1, wherein the conductor is a semiconductor.

20. The method of claim 1, wherein after step c) the radius of curvature of the tip apex is 2 nm or less.

21. The method of claim 1, wherein a constant voltage is applied to the conductor.

22. The method of claim 21, further comprising repetition of step c) with a different constant voltage applied to the conductor.

23. The method of claim 21, further comprising repetition of step c) with a time varying voltage applied to the conductor.

24. The method of claim 1, wherein a varying voltage is applied to the conductor.

* * * * *